(12) United States Patent
Son et al.

(10) Patent No.: US 7,903,204 B2
(45) Date of Patent: Mar. 8, 2011

(54) POLARIZING PLATE AND LIQUID CRYSTAL DISPLAY PANEL HAVING THE SAME

(75) Inventors: Hyun Duck Son, Yongin (KR); Kweon Sam Hong, Seoul (KR); Sang Gun Choi, Suwon (KR)

(73) Assignee: Samsung Electronics Co., Ltd. (KR)

( * ) Notice: Subject to any disclaimer, the term of this patent is extended or adjusted under 35 U.S.C. 154(b) by 954 days.

(21) Appl. No.: 11/621,140

(22) Filed: Jan. 9, 2007

(65) Prior Publication Data

US 2007/0171335 A1 Jul. 26, 2007

(30) Foreign Application Priority Data

Jan. 9, 2006 (KR) .................. 10-2006-0002343

(51) Int. Cl.
*G02F 1/1335* (2006.01)
*G02F 1/1333* (2006.01)

(52) U.S. Cl. .......................................... 349/96; 349/122

(58) Field of Classification Search .................... 349/96, 349/122
See application file for complete search history.

(56) References Cited

U.S. PATENT DOCUMENTS

| | | | | |
|---|---|---|---|---|
| 6,177,921 B1 * | 1/2001 | Comiskey et al. | ............ | 345/107 |
| 6,485,884 B2 * | 11/2002 | Wolk et al. | .................... | 430/200 |
| 7,038,746 B2 * | 5/2006 | Tominaga et al. | ............. | 349/96 |
| 7,163,746 B2 * | 1/2007 | Savage et al. | ................ | 428/407 |
| 7,291,970 B2 * | 11/2007 | Kuwabara | .................... | 313/504 |
| 7,413,766 B2 * | 8/2008 | Satake et al. | ................. | 427/162 |
| 7,662,456 B2 * | 2/2010 | Bell | ............................. | 428/40.1 |

* cited by examiner

*Primary Examiner* — James A Dudek
(74) *Attorney, Agent, or Firm* — Cantor Colburn LLP (57) ABSTRACT

A polarizing plate formed with an antistatic film preventing the formation of stains caused by the generation of static electricity and a liquid crystal display panel comprising the same. The polarizing plate includes a polarizer polarizing incident light, a first and a second protection film formed on opposing surfaces of the polarizer, respectively, and protecting the polarizer, a first antistatic film formed on the first protection film and an adhesive layer formed on the first antistatic film.

19 Claims, 9 Drawing Sheets

POLARIZING PLATE AND LIQUID CRYSTAL DISPLAY PANEL HAVING THE SAME

This application claims priority to Korean Patent application No. 2006-0002343 filed on Jan. 9, 2006, and all the benefits accruing therefrom under 35 U.S.C. §119, the contents of which are herein incorporated by reference in its entirety.

BACKGROUND OF THE INVENTION

1. Field of the Invention

The present invention relates to a polarizing plate and a liquid crystal display panel including the same, and more particularly, to a polarizing plate formed with an antistatic film for preventing the formation of stains caused by the generation of static electricity and a liquid crystal display panel including the same.

2. Description of the Related Art

In general, the application range of a liquid crystal display (LCD) has been extended because of its good lightweight, thin, low-power drive, full color and high resolution characteristics. Such an LCD has been used in a computer, a notebook computer, PDA, a telephone, TV, an audio/video device, and the like. The LCD is used to adjust an amount of light transmitted in accordance with image signals applied to a number of control switches arrayed in a matrix form and then display desired images on an LCD panel. Since such an LCD is not self-luminescent, it needs a light source such as a backlight and polarizing plates are attached to both surfaces of the LCD panel.

A conventional polarizing plate includes a polarizer, a protection film for protecting the polarizer, an adhesive, a surface protection film and a release film.

Static electricity is generated due to the generation of static charge when a protection film and a release film are peeled off from surfaces of a polarizing plate to attach the polarizing plate onto a substrate of a liquid crystal display panel. At this time, electrostatic stains are formed on the substrate since the generated static electricity is electrically charged to the substrate of the liquid crystal display panel. While inspecting the liquid crystal display panel, the electrostatic stains serve as noises and deteriorate the inspection accuracy.

BRIEF SUMMARY OF THE INVENTION

An exemplary embodiment provides a polarizing plate formed with an antistatic film for preventing the formation of stains caused by the generation of static electricity and a liquid crystal display panel comprising the same.

In one exemplary embodiment, there is provided a polarizing plate including a polarizer polarizing incident light, a first and a second protection film formed on opposing surfaces of the polarizer, respectively, and protecting the polarizer, a first antistatic film formed on the first protection film and an adhesive layer formed on the first antistatic film.

In another exemplary embodiment, the polarizing plate may further include an optical compensation film formed between the first antistatic film and the first protection film.

In another exemplary embodiment, the polarizing plate may further include a second antistatic film formed on the second protection film.

In one exemplary embodiment, the polarizer may include polyvinyl alcohol (PVA).

In another exemplary embodiment, the protection films may include triacetyl cellulose (TAC).

In another exemplary embodiment, the antistatic film may include surfactant.

In another exemplary embodiment, the antistatic film includes a conductive polymer material.

In one exemplary embodiment, he conductive polymer material may include polyethylenedioxythiophene (PEDOT).

In another exemplary embodiment, there is provided a polarizing plate including a polarizer polarizing incident light, a first protection film formed on a first surface of the polarizer, protecting the polarizer and performing an optical compensation function, a second protection film formed on a second surface of the polarizer and protecting the polarizer, first and second antistatic films formed on the first and second protection films, respectively and an adhesive layer formed on the first antistatic film.

In another exemplary embodiment, there is provided a liquid crystal display panel including a polarizing plate including a polarizer polarizing incident light, a first and a second protection film formed on opposing surfaces of the polarizer, respectively, and protecting the polarizer, a first antistatic film formed on the first protection film and an adhesive layer formed on the first antistatic film.

In another exemplary embodiment, there is provided a liquid crystal display panel including a polarizer polarizing incident light, a first protection film formed on a first surface of the polarizer, protecting the polarizer and performing an optical compensation function, a second protection film formed on a second surface of the polarizer and protecting the polarizer, first and second antistatic films formed on the first and second protection films, respectively and an adhesive layer formed on the first antistatic film.

In another exemplary embodiment, a method of forming a polarizer is provided, the method including forming a first and a second protection layer on opposing surfaces of a polarizer, disposing a first antistatic layer on the first protection layer and disposing an adhesive layer on the first antistatic layer.

In another exemplary embodiment, a method of forming a liquid crystal display is provided, the method including, forming a display panel and attaching a first polarizer and a second polarizer on opposing sides of the display panel. The first and second polarizers include a polarizer polarizing incident light, a first protection film and a second protection film formed on opposing surfaces of the polarizer, respectively, protecting the polarizer, a first antistatic film formed on the first protection film and an adhesive layer formed on the first antistatic film.

BRIEF DESCRIPTION OF THE DRAWINGS

The above and other objects, features and advantages of the present invention will become apparent from the following description of preferred embodiments given in conjunction with the accompanying drawings, in which:

FIGS. 6A to 8D are photographs in which electrostatic stains formed on polarizing plates according to the prior art are compared with electrostatic stains formed on exemplary embodiments of the polarizing plate according to the present invention.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or disposed "onto" another element or layer, the element or layer can be directly on another element or layer or intervening elements or layers. In contrast, when an element is referred to as being "directly on" or disposed "directly onto" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
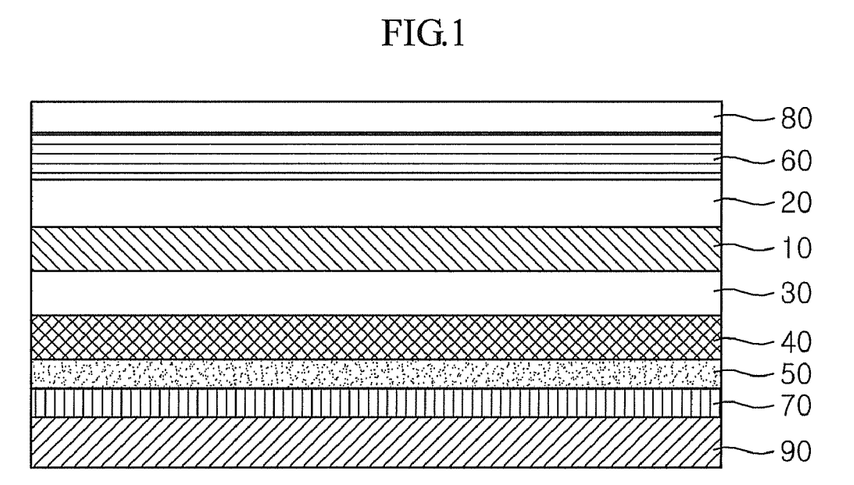
FIG. 1 is a cross sectional view illustrating an exemplary embodiment of a polarizing plate according to the present invention.

Hereinafter, embodiments of the present invention will be described in detail with reference to the accompanying drawings. FIG. 1 is a cross sectional view of an exemplary embodiment of a polarizing plate according to the present invention.

Referring to FIG. 1, the polarizing plate comprises a polarizer 10, protection layers 20 and 30, an optical compensation layer 40, a first antistatic layer 50, a second antistatic layer 60, an adhesive layer 70, a surface protection layer 80 and a release layer 90. In exemplary embodiments, the layers 20, 30, 40, 50, 60, 70, 80 and 90 may be in the form of a sheet or a film, or may include other forms as is suitable for the purpose described herein. For convenience, the "layers" described above will be referred to as "films."

The polarizer 10 functions to polarize light incident into the polarizing plate and the protection films 20 and 30 are formed on opposing surfaces of the polarizer 10, respectively. The optical compensation film 40 is formed on the protection film 30 and the first antistatic film 50 is formed on the optical compensation film 40 to reduce or effectively prevent the generation of static electricity. The second antistatic film 60 is formed on the protection film 20 to reduce or effectively prevent the generation of static electricity. The surface protection film 80 is formed on the second antistatic film 60 to protect the surface of the polarizing plate and the adhesive layer 70 is formed on the first antistatic film 50 to allow the polarizing plate to be attached to another assembly, such as to a substrate of a liquid crystal display panel or the like. The release film 90 is formed on the adhesive layer 70.

In one exemplary embodiment, the polarizer 10 is formed by stretching a polyvinyl alcohol (PVA) film, dipping the stretched PVA film into a solution containing iodine ($I_2$) and dichroic dyes and then arranging iodine molecules and dye molecules side by side in a stretching direction. The polarizer may have functions of absorbing light oscillating in the stretching direction and transmitting light oscillating in a direction perpendicular to the stretching direction since the iodine molecules and dye molecules show dichromatism. This polarizer 10 by itself may have weak mechanical strength in a direction of a transmission axis, may be contracted by heat or moisture or may have low polarization performance, which may be addressed by the polarizer 10 being disposed between the protection films 20 and 30.

In another exemplary embodiment, the protection films 20 and 30 for protecting the polarizer 10 are prepared using triacetyl cellulose (TAC). The TAC is used as a material for protection films of a polarizing plate since it has high light transmissivity, relatively low birefringence and easily obtains hydrophilicity through surface modification such that the TAC material can be easily deposited on the polarizer. However, in alternative exemplary embodiments, a material for the protection films is not limited to TAC, and any material can be used as a protection film so long as the material satisfies the aforementioned conditions.

In another exemplary embodiment, the optical compensation film 40 may be a viewing angle compensation film capable of performing a function of widening a viewing angle. Widening the viewing angle allows images to be clearly seen even when the images are viewed in a slightly oblique direction that is not perpendicular to the images formed on a liquid crystal display panel. However, the optical compensation film is not limited thereto. In alternative exemplary embodiments, the optical compensation film may be a brightness enhancement film for performing the enhancement of luminance or a phase difference plate for performing a function of converting linearly polarized light into elliptically polarized light or circularly polarized light.

The first antistatic film 50 is formed between the adhesive layer 70 and the optical compensation film 40. The first antistatic film 50 functions to suppress the generation of static electricity when the release film 90 is removed to expose the adhesive layer 70. In exemplary embodiments, the first antistatic film 50 may be formed of a material containing surfactant. In other exemplary embodiments, the first antistatic film 50 may be formed of a conductive polymer material. In one exemplary embodiment, the first antistatic film 50 includes polyethylenedioxythiophene (PEDOT).

If the first antistatic film 50 is formed between the optical compensation film 40 and the adhesive layer 70, electric charges that may be generated when the release film 90 is peeled off may be smoothly dispersed to prevent the electric charges from being concentrated on a certain region on the surface of the polarizing plate. As a result, when the polarizing plate is attached onto a substrate, the first antistatic film 50 can prevent the substrate from being electrically charged to avoid the formation of stains on the substrate due to the generation of static electricity.

The second antistatic film 60 may be formed of the same material as the first antistatic film 50 or may include a different material. If the second antistatic film 60 is formed between the protection film 20 and the surface protection film 80, electric charges that may be generated when the surface protection film 80 is peeled off may be smoothly dispersed to prevent the electric charges from being concentrated on a certain region on the surface of the polarizing plate.

In exemplary embodiments, the first and second antistatic films 50 and 60 are formed as thin as possible to minimize the reduction in transmissivity of the polarizing plate. It may be possible to make the first and second antistatic films 50 and 60 relatively thinner as the low surface resistances of materials for the first and second antistatic films 50 and 60 are further decreased. Alternative embodiments may include configurations where the surface resistance of the conductive polymer material, e.g. PEDOT, is within a range of $10^6$ to $10^7$ Ω/Sq and the surface resistance of a surfactant is within a range of $10^9$ to $10^{10}$ Ω/Sq. Therefore, the conductive polymer material may be formed into an antistatic film with a thickness of about 0.5 μm and the surfactant can be formed into an antistatic film with a thickness of about 3 μm.

Figure 2:
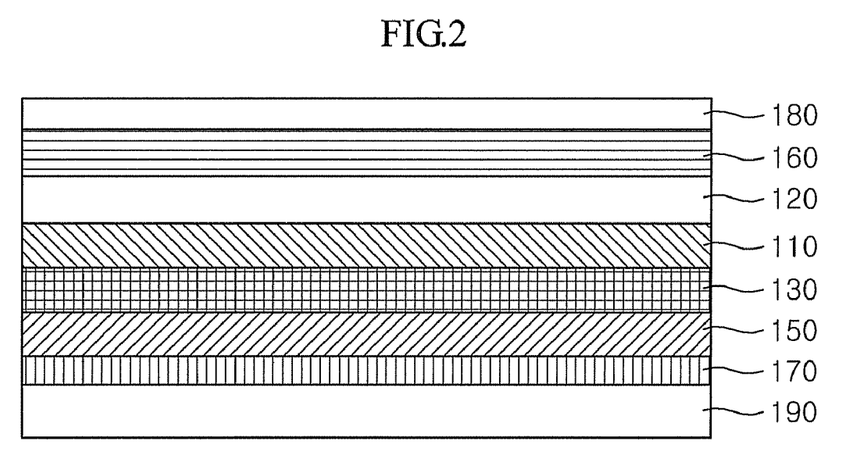
FIG. 2 is a cross sectional view illustrating another exemplary embodiment of a polarizing plate according to the present invention.

FIG. 2 is a cross sectional view of another exemplary embodiment of a polarizing plate according to the present invention. A polarizing plate of FIG. 2 is different from that of FIG. 1 in that a single protection film having both an optical compensation function and a polarizer protection function can be used in the polarizing plate. The other components of the polarizing plate of FIG. 2 are substantially the same to those of FIG. 1

Referring to FIG. 2, the polarizing plate comprises a polarizer 110, a first protection film 130, a second protection film 120, a first antistatic film 150, a second antistatic film 160, an adhesive layer 170, a surface protection film 180, and a release film 190.

The polarizer 110 functions to polarize light incident into the polarizing plate. The first protection film 130 is formed on a surface of the polarizer 110 and the second protection film 120 is formed on the other surface of the polarizer 110, whereby the two surfaces are opposite each other. The first antistatic film 150 is formed on the first protection film 130 to reduce or effectively prevent the generation of static electricity and the second antistatic film 160 is formed on the second protection film 120 to reduce or effectively prevent the generation of static electricity. The surface protection film 180 is formed on the second antistatic film 160 to protect the surface of the polarizing plate and the adhesive layer 170 is formed on the first antistatic film 150 to allow the polarizing plate to be attached to another element or assembly, such as onto a substrate of a liquid crystal display panel or the like. The release film 190 is formed on the adhesive layer 170.

The first protection film 130 has an optical compensation function and performs a function of protecting the polarizer 110 at the same time. The optical compensation film 130 can perform a function of widening a viewing angle to allow images to be clearly seen even when the images are viewed in a slightly oblique direction that is not perpendicular to the images formed on a liquid crystal display panel. However, the first protection film is not limited thereto. In exemplary embodiments, the integrated protection film 130 may have a function of enhancing the brightness or a function of converting linearly polarized light into elliptically polarized light or circularly polarized light. In other exemplary embodiments, the first protection film 130 may also function to support and protect the polarizer 110 in addition to the aforementioned functions.

As discussed above, the first and second antistatic films 150 and 160 may be formed of materials containing surfactant. Alternative embodiments may include configurations where the antistatic films 150 and 160 may be made of a conductive polymer material, and polyethylenedioxythiophene (PEDOT).

The first and second antistatic films 150 and 160 enable electric charges, which are generated when the surface protection film 180 or release film 190 is peeled off, to be smoothly dispersed in order to prevent the electrical charges from being concentrated on a certain region on the surface of the polarizing plate. Advantageously, when the polarizing plate is attached onto a substrate, the first antistatic film can prevent the substrate from being electrically charged to avoid the formation of stains on the substrate due to the generation of static electricity.

Figure 3:
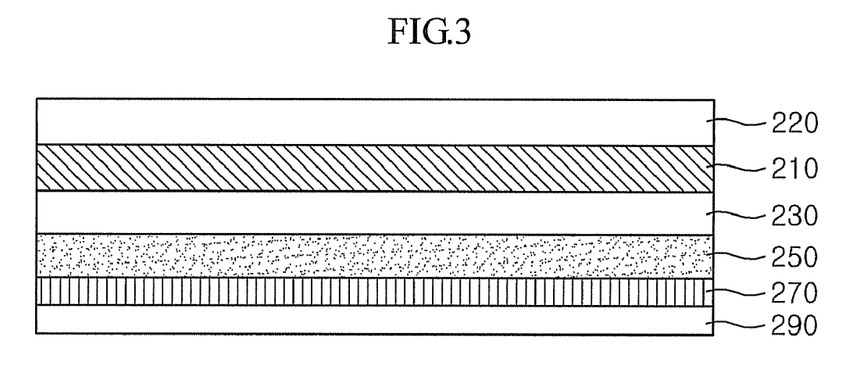
FIG. 3 is a cross sectional view illustrating another exemplary embodiment of a polarizing plate according to the present invention.

FIG. 3 is a cross sectional view of a polarizing plate according to the present invention. A polarizing plate of FIG. 3 is different from those of FIGS. 1 and 2 in that protection films are merely used in the polarizing plate. The other components of the polarizing plate in FIG. 3 are substantially the same to those of the previous embodiments.

Referring to FIG. 3, the polarizing plate comprises a polarizer 210, protection films 220 and 230, a first antistatic film 250, an adhesive layer 270 and a release film 290.

The polarizer 210 functions to polarize light incident into the polarizing plate. The protection films 220 and 230 are formed on opposing surfaces of the polarizer 210, respectively. The first antistatic film 250 is formed on the protection film 230 to reduce or effectively prevent the generation of static electricity. The adhesive layer 270 is formed on the first antistatic film 250 to allow the polarizing plate to be attached onto a substrate of a liquid crystal display panel or the like. The release film 290 is formed on the adhesive layer 270. As a result, it may be possible to smoothly disperse electric charges generated when the release film 290 is peeled off. Advantageously, the antistatic film may reduce or effectively prevent the electric charges from being concentrated on a certain region on the surface of the polarizing plate in order to avoid the formation of stains on the substrate due to the generation of static electricity.

In an alternative exemplary embodiment, a second antistatic film for preventing the generation of static electricity may be formed on the protection film 220 and a surface protection film for protecting the surface of the polarizing plate may be further formed on the second antistatic film.

Figure 4:
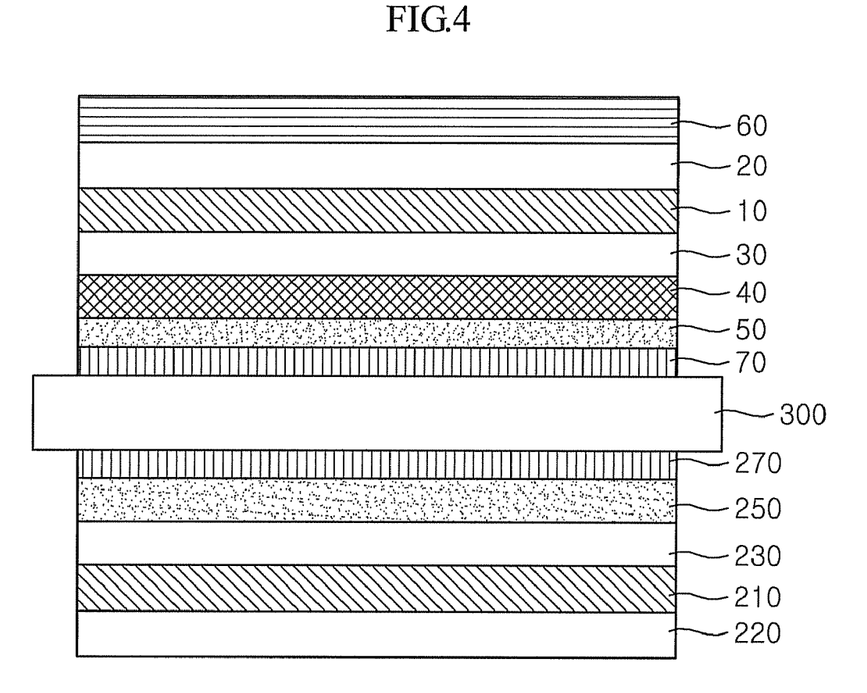
FIG. 4 is a cross sectional view illustrating an exemplary embodiment of a liquid crystal display panel to which a polarizing plate is attached according to the present invention.

FIG. 4 is a cross sectional view illustrating an exemplary embodiment of a liquid crystal display panel to which a polarizing plate is attached according to the present invention.

Referring to FIG. 4, a first polarizing plate is attached to an upper surface of a liquid crystal display panel 300, and a second polarizing plate is attached to a lower surface of the liquid crystal display panel 300. The first polarizing plate may be considered a polarizing plate with the surface protection film 80 and the release film 90 peeled off from the aforementioned polarizing plate according to FIG. 1 and the second polarizing plate may be considered a polarizing plate with the release film 290 peeled off from the aforementioned polarizing plate according to FIG. 3. Alternative embodiments may include any of a number of configurations of the polarizing plates as is suitable for the purposes described herein.

The first polarizing plate in which the adhesive layer 70, the first antistatic film 50, the optical compensation film 40, the protection film 30, the polarizer 10, the protection film 20 and the second antistatic film 60 are sequentially formed is attached onto a top surface of the liquid crystal display panel 300 and the second polarizing plate in which the adhesive layer 270, the first antistatic film 250, the first protection film 230, the polarizer 210 and the second protection film 220 are sequentially formed is attached onto a bottom surface of the liquid crystal display panel 300. In one exemplary embodiment, the adhesive layer 270 may include a pressure sensitive adhesive.

The first and second polarizing plates formed with the antistatic films and attached onto the liquid crystal display panel reduce or effectively prevent electric charges from being electrically charged on the liquid crystal display panel in order to avoid the formation of stains on the liquid crystal display panel due to the generation of static electricity. Advantageously, inspection accuracy may be improved when inspecting driving of the liquid crystal display panel.

Figure 5:
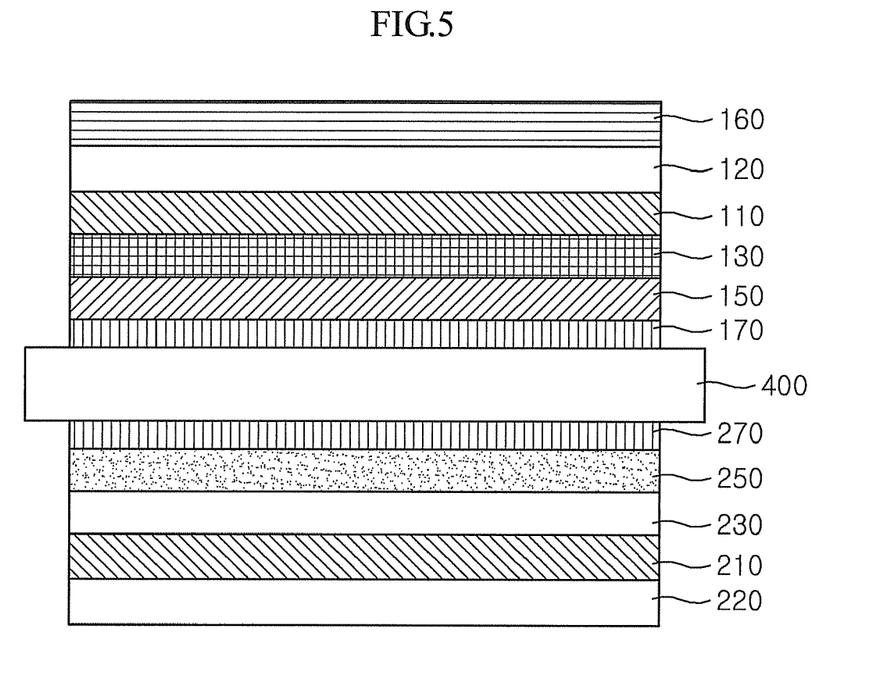
FIG. 5 is a cross sectional view illustrating another exemplary embodiment of a liquid crystal display panel to which a polarizing plate is attached according to the present invention.

FIG. 5 is a cross sectional view illustrating another exemplary embodiment of a liquid crystal display panel to which a polarizing plate is attached according to the present invention.

Referring to FIG. 5, a third polarizing plate is attached to one surface of a liquid crystal display panel 400 and a second polarizing plate is attached to the other surface of the liquid crystal display panel 400.

The third polarizing plate may be considered a polarizing plate with the surface protection film 180 and the release film 190 peeled off from the aforementioned polarizing plate according to FIG. 2 and the second polarizing plate may be considered a polarizing plate with the release film 290 peeled off from FIG. 3. Alternative embodiments may include any of a number of configurations of the polarizing plates as is suitable for the purposes described herein.

The third polarizing plate in which the adhesive layer 170, the first antistatic film 150, the first protection film 130, the polarizer 110, the second protection film 120 and the second antistatic film 160 are sequentially formed is attached onto a top surface of the liquid crystal display panel 400. The second polarizing plate in which the adhesive layer 270, the first antistatic film 250, the first protection film 230, the polarizer 210 and the second protection film 220 are sequentially formed is attached onto a bottom surface of the liquid crystal display panel 400.

FIGS. 6A to 8D are photographs in which electrostatic stains formed on the polarizing plate according to polarizing plates of the prior art are compared with electrostatic stains formed on exemplary embodiments of the polarizing plate according to the present invention.

Figure 6A:
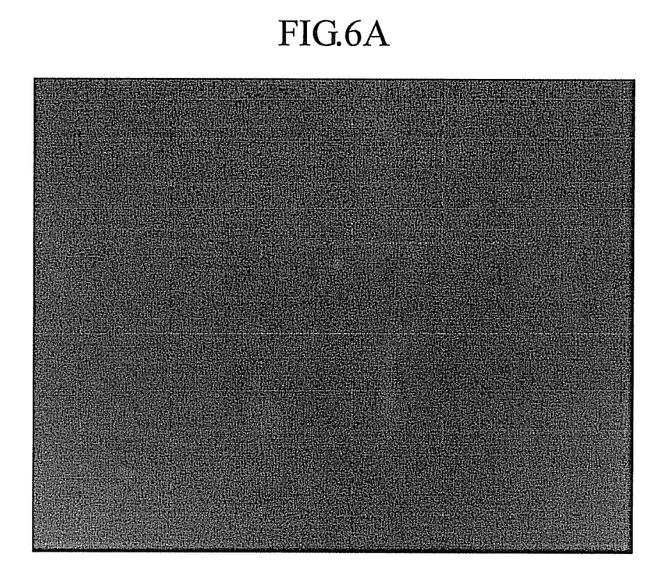
Figure 6B:
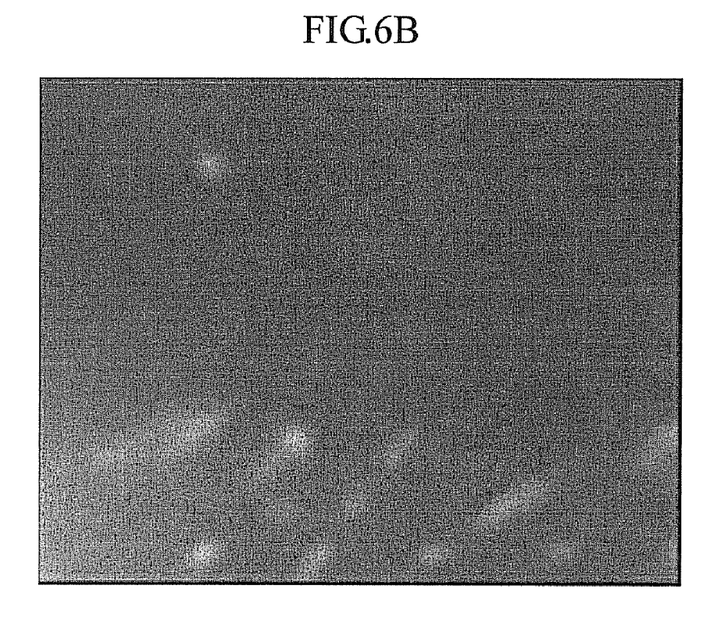
Figure 6C:
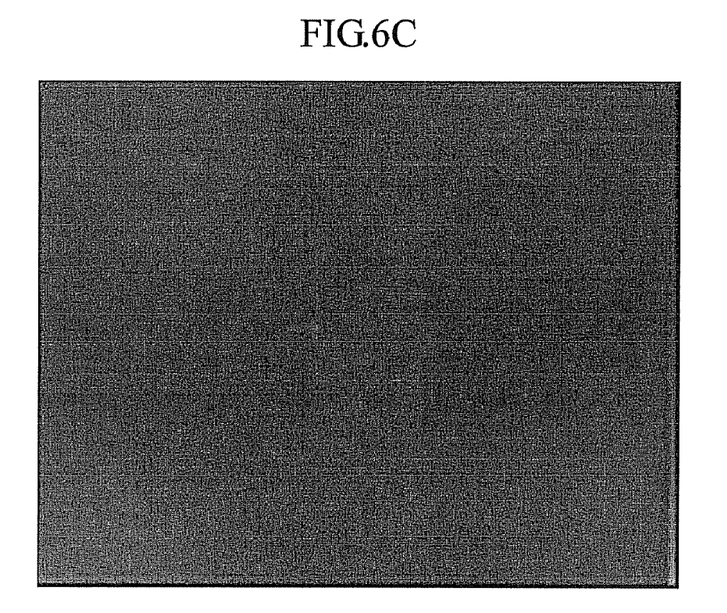
Figure 6D:
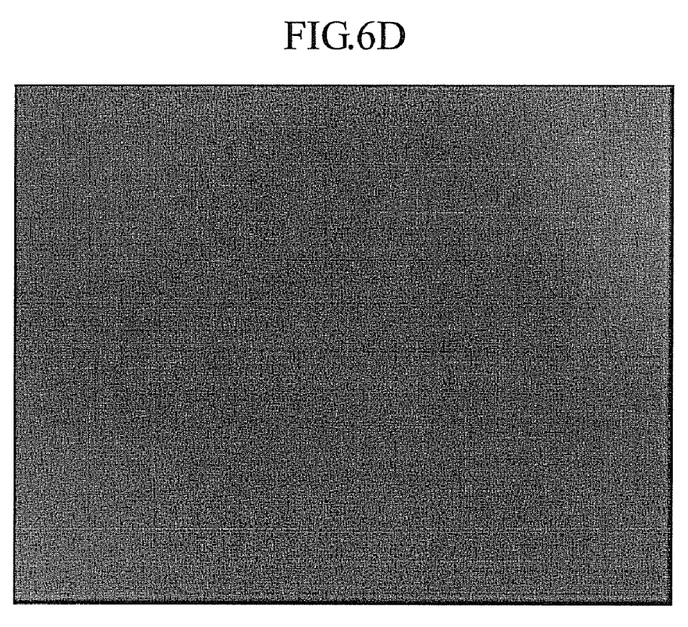
Figure 7A:
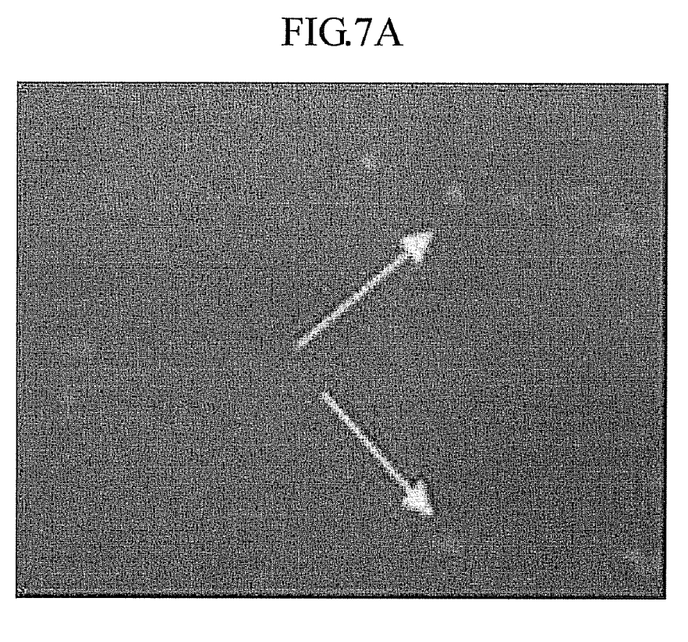
Figure 7B:
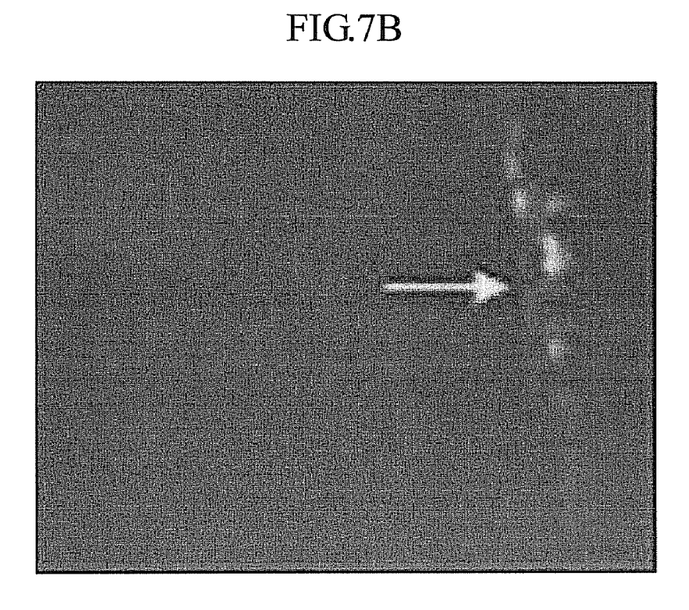
Figure 7C:
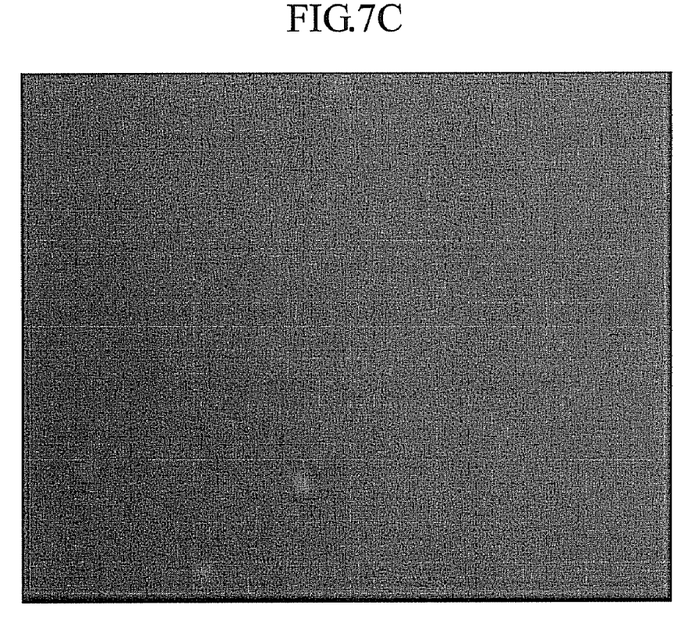
Figure 7D:
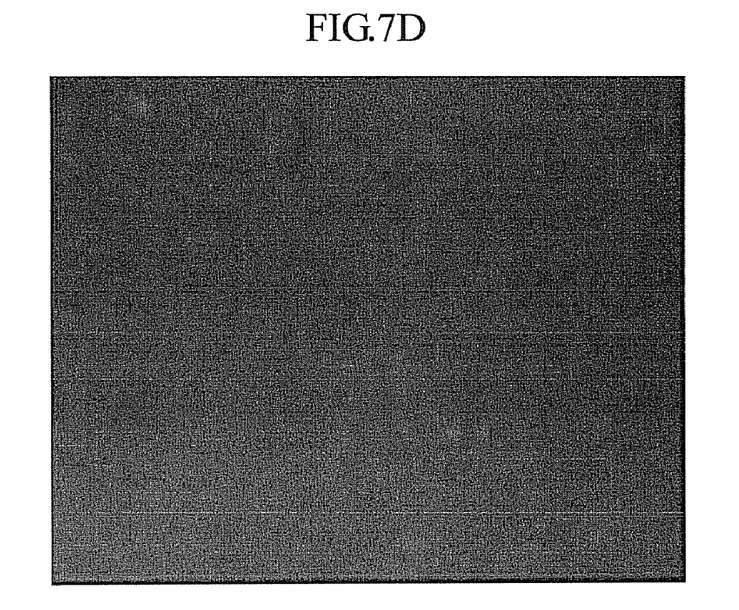
Figure 8A:
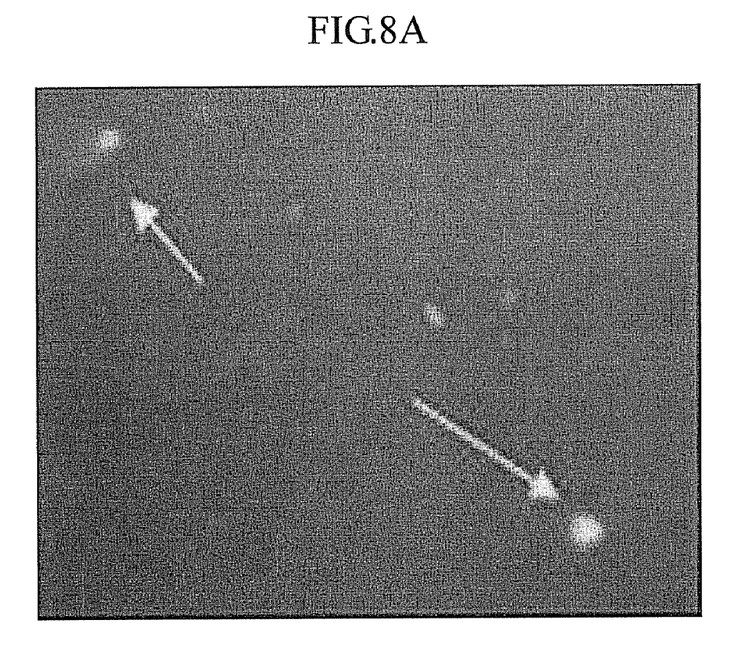
Figure 8B:
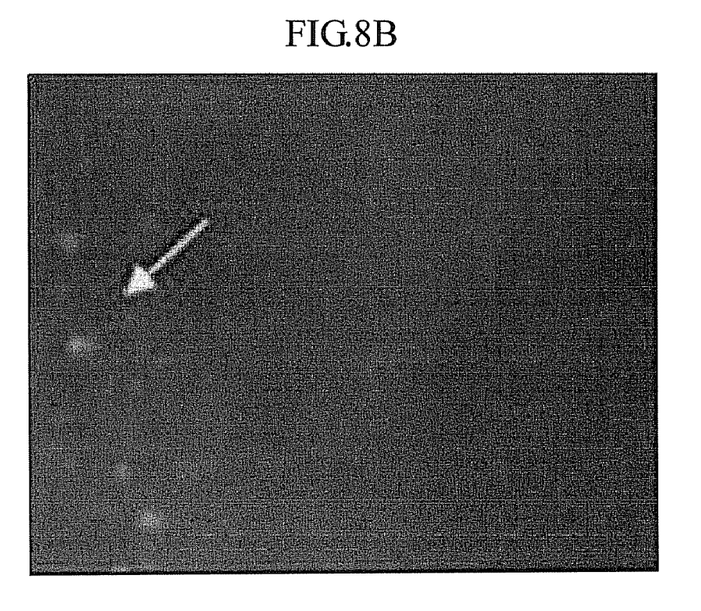
Figure 8C:
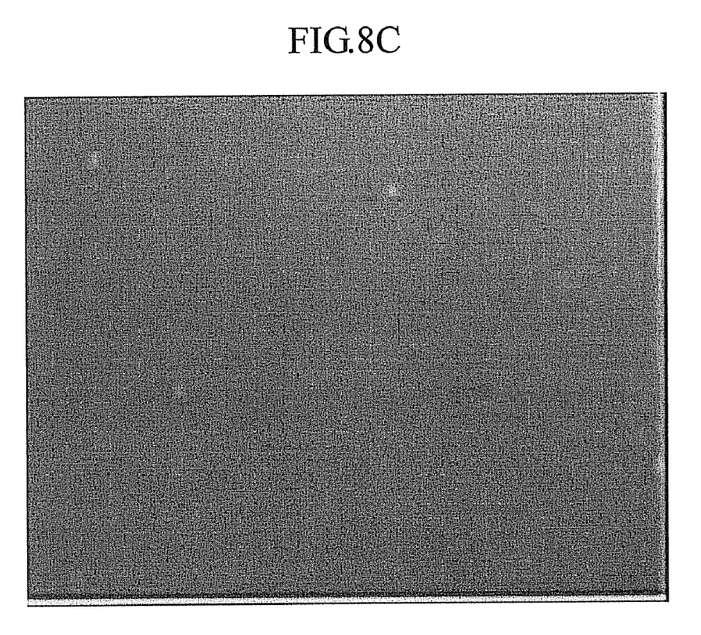
Figure 8D:
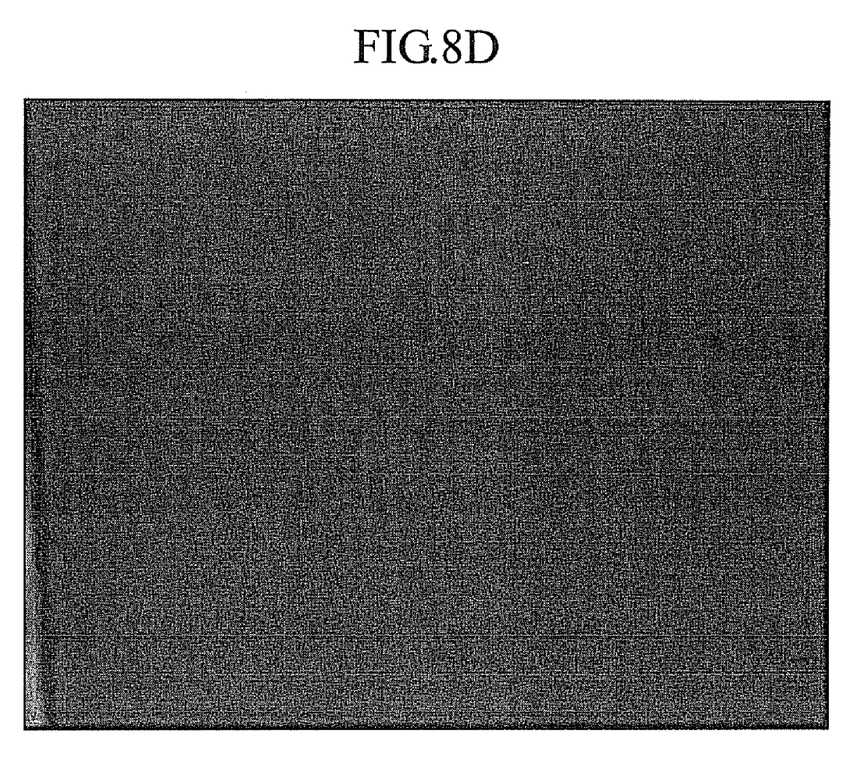

FIGS. 6A and 6B are photographs showing electrostatic stains formed on a liquid crystal display panel when a polarizing plate according to the prior art is attached to the liquid crystal display panel. In comparison, FIG. 6C and FIG. 6D are photographs showing electrostatic stains formed on a liquid crystal display panel when the first and second polarizing plates shown in FIG. 4 are attached to the liquid crystal display panel 300. It can be seen that electrostatic stains are hardly formed on the liquid crystal display panel when the polarizing plates formed with an antistatic film of FIG. 4 is attached to the liquid crystal display panel. The antistatic films used in the polarizing plate of FIG. 4 include a conductive polymer material.

FIGS. 7A and 7B and FIGS. 8A and 8B are photographs showing electrostatic stains formed on a liquid crystal display panel when a polarizing plate according to the prior art is attached to the liquid crystal display panel. In contrast, FIGS. 7C and 7D and FIGS. 8C and 8D are photographs showing electrostatic stains formed on the liquid crystal display panel when the polarizing plates shown in FIG. 5 are attached to the liquid crystal display panel 400.

As illustrated in the above photographs, it can be seen that electrostatic stains are reduced or hardly formed on the liquid crystal display panel when the polarizing plate formed with an antistatic film is attached to the liquid crystal display panel. The antistatic films used in the polarizing plates of FIGS. 7C and 7D include a conductive polymer material, while the antistatic films used in the polarizing plates of FIGS. 8C and 8D include surfactant.

Although a polarizing plate attached to a liquid crystal display panel is illustrated by way of example in the foregoing embodiments, the present invention is not limited to a device in which the liquid crystal display is used as a display device. That is, the present invention can be applied similarly to a display device in which a polarizing plate according to the present invention is employed. In exemplary embodiments, polarizing plates according to the present invention may also be applied to an optical device to which a polarizing plate is applied even though the optical device is not a display device.

In exemplary embodiments, the antistatic films are formed on the polarizing plate to suppress the generation of static electricity when the surface protection film or release film is peeled off. The formation of electrostatic stains on the substrate of the liquid crystal display panel are reduced or effectively prevented. Advantageously, the inspection accuracy of the liquid crystal display panel can be improved.

Although the present invention have been illustrated and described in connection with the embodiments and the accompanying drawings, it is not limited thereto but defined by the appended claims. Accordingly, it will be readily understood by those skilled in the art that various modifications and changes can be made thereto without departing from the spirit and scope of the present invention defined by the appended claims.

What is claimed is:

1. A polarizing plate comprising:
a polarizer polarizing incident light;
a first protection film and a second protection film formed on opposing surfaces of the polarizer, respectively, and protecting the polarizer;
a first antistatic film formed on the first protection film;
an optical compensation film formed between the first antistatic film and the first protection film; and
an adhesive layer formed on the first antistatic film, wherein the adhesive layer directly contacts the first antistatic film.

2. The polarizing plate as claimed in claim 1, further comprising a second antistatic film formed on the second protection film.

3. The polarizing plate as claimed in claim 1, wherein the polarizer comprises polyvinyl alcohol (PVA).

4. The polarizing plate as claimed in claim 1, wherein the protection films comprise triacetyl cellulose (TAC).

5. The polarizing plate as claimed in claim 1, wherein the first antistatic film comprises surfactant.

6. The polarizing plate as claimed in claim 2, wherein the first and the second antistatic film comprise surfactant.

7. The polarizing plate as claimed in claim 1, wherein the first antistatic film comprises a conductive polymer material.

8. The polarizing plate as claimed in claim 7, wherein the conductive polymer material comprises polyethylenedioxythiophene (PEDOT).

9. The polarizing plate as claimed in claim 2, wherein the first and the second antistatic film comprise a conductive polymer material.

10. The polarizing plate as claimed in claim 9, wherein the conductive polymer material comprises polyethylenedioxythiophene (PEDOT).

11. A polarizing plate comprising:
a polarizer polarizing incident light;
a first protection film formed on a first surface of the polarizer protecting the polarizer and performing an optical compensation function;
a second protection film formed on a second surface of the polarizer and protecting the polarizer;
first and second antistatic films formed on the first and second protection films, respectively; and
an adhesive layer formed on the first antistatic film, wherein the adhesive layer directly contacts the first antistatic film.

12. A liquid crystal display panel, comprising:
a polarizing plate,
said polarizing plate comprising:
a polarizer polarizing incident light;
protection films formed on opposing surfaces of the polarizer, respectively, and protecting the polarizer;
a first antistatic film formed on one of the protection films;
an optical compensation film formed between the first antistatic film and the first protection film; and
an adhesive layer formed on the first antistatic film, wherein the adhesive layer directly contacts the first antistatic film.

13. A liquid crystal display panel, comprising:
a polarizing plate,
said polarizing plate comprising:
a polarizer polarizing incident light;
a first protection film formed on a surface of the polarizer, protecting the polarizer and performing an optical compensation function;
a second protection film formed on another surface of the polarizer to protect the polarizer;
first and second antistatic films formed on the first and second protection films, respectively; and
an adhesive layer formed on the first antistatic film, wherein the adhesive layer directly contacts the first antistatic film.

14. A method of forming a polarizer plate, the method comprising:
forming a first and a second protection layer on opposing surfaces of a polarizer;
disposing a first antistatic layer on the first protection layer;
disposing an optical compensation film between the first antistatic film and the first protection film; and
disposing an adhesive layer on the first antistatic layer, wherein the adhesive layer directly contacts the first antistatic film.

15. The method as claimed in claim 14, wherein the first protection layer protects the polarizer and performs an optical compensation function.

16. The method as claimed in claim 14, further comprising disposing an optical compensation layer between the first protection layer and the first antistatic layer.

17. The method as claimed in claim 14, further comprising disposing a second antistatic layer on the second protection layer.

18. A method of forming a liquid crystal display, the method comprising:
forming a display panel;
attaching a first polarizing plate and a second polarizing plate on opposing sides of the display panel, wherein the first and second polarizing plates comprise:
a polarizer polarizing incident light;
a first protection film and a second protection film formed on opposing surfaces of the polarizer, respectively, protecting the polarizer;
a first antistatic film formed on the first protection film;
an optical compensation film formed between the first antistatic film and the first protection film; and
an adhesive layer formed on the first antistatic film, wherein the adhesive layer directly contacts the first antistatic film.

19. The method as claimed in claim 18, wherein the first protection film performs an optical compensation function.

* * * * *